United States Patent
Brown

(10) Patent No.: US 7,856,095 B2
(45) Date of Patent: Dec. 21, 2010

(54) SYSTEM AND METHOD FOR PROVIDING A BASELINE FOR QUALITY METRICS IN A CONTACT CENTER

(75) Inventor: Donald E. Brown, Indianapolis, IN (US)

(73) Assignee: Interactive Intelligence, Inc., Indianapolis, IN (US)

( * ) Notice: Subject to any disclaimer, the term of this patent is extended or adjusted under 35 U.S.C. 154(b) by 1091 days.

(21) Appl. No.: 11/381,661

(22) Filed: May 4, 2006

(65) Prior Publication Data

US 2007/0274502 A1   Nov. 29, 2007

(51) Int. Cl.
*H04M 3/00* (2006.01)
*H04M 5/00* (2006.01)

(52) U.S. Cl. ............ 379/265.06; 379/265.03

(58) Field of Classification Search ........ 379/265.06, 379/265.03; 704/251; 707/10
See application file for complete search history.

(56) References Cited

U.S. PATENT DOCUMENTS

| | | | |
|---|---|---|---|
| 5,535,256 A | 7/1996 | Maloney et al. | |
| 5,696,811 A | 12/1997 | Maloney et al. | |
| 5,818,907 A | 10/1998 | Maloney et al. | |
| 5,946,375 A | 8/1999 | Pattison et al. | |
| 6,058,163 A | 5/2000 | Pattison et al. | |
| 6,263,049 B1 | 7/2001 | Kuhn | |
| 6,707,904 B1 | 3/2004 | Judkins et al. | |
| 6,775,377 B2 | 8/2004 | McIllwaine et al. | |
| 6,959,078 B1 | 10/2005 | Eilbacher et al. | |
| 6,959,079 B2 | 10/2005 | Elazar | |
| 7,346,509 B2 * | 3/2008 | Gallino | 704/251 |
| 2001/0043697 A1 | 11/2001 | Cox et al. | |
| 2002/0009190 A1 | 1/2002 | McIllwaine et al. | |
| 2004/0165717 A1 | 8/2004 | McIllwaine et al. | |
| 2004/0202308 A1 | 10/2004 | Baggenstoss et al. | |
| 2004/0202309 A1 | 10/2004 | Baggenstoss et al. | |
| 2006/0179064 A1 * | 8/2006 | Paz et al. | 707/10 |
| 2008/0208582 A1 * | 8/2008 | Gallino | 704/251 |

* cited by examiner

*Primary Examiner*—Thjuan K Addy
(74) *Attorney, Agent, or Firm*—Woodard, Emhardt, Moriarty McNett & Henry, LLP

(57) ABSTRACT

A computer-implemented system and method for assisting managers of a contact center is provided. The monitoring of agent communications is performed automatically and the communications are assigned to a group of supervisors for scoring. The scores assigned to the communications are then received and programmatically evaluated against predetermined criteria to determine the quality of the supervisors' performance. If the quality of performance is below an acceptable threshold, then the need for supervisor performance improvement is indicated. In one embodiment, the system automatically schedules a session for establishing/reinforcing a set of scoring guidelines in response to the indication.

38 Claims, 4 Drawing Sheets

SYSTEM AND METHOD FOR PROVIDING A BASELINE FOR QUALITY METRICS IN A CONTACT CENTER

FIELD OF THE INVENTION

The present invention generally relates to telecommunication systems and methods, as well as systems for operating contact centers. More particularly, the present invention pertains to a system and method for automatically monitoring the process of assigning metrics to monitored communications within a contact center, including the functions of assigning communications to a group of supervisors for scoring, evaluating the scores assigned to the communications, and in response to a negative evaluation, establishing scoring criteria and/or reinforcing a set of scoring standards.

BACKGROUND

A number of businesses and other organizations provide contact centers in which a plurality of personnel answer calls, such as telephone calls or other inquiries, e.g. from potential or existing customers. Contact centers serve a number of functions including facilitating the placement of orders for goods or services, providing information about products or the status of orders, receiving customer complaints or suggestions, dispensing product or technical information to assist customers in selecting or using products or services and the like.

Many such contact centers are configured so that the telephone or other communications facilities manned by the contact center personnel are coupled via a computer controlled system, e.g. for routing calls to available agents or other personnel. In the past, some such systems have included devices for facilitating supervision and/or monitoring the performance of such agents. For example, some devices are configured to collect, store, and/or analyze statistical data, while others store actual call recordings to be later analyzed and/or scored by contact center supervisors.

While previous systems of this type for facilitating supervision of contact center agents may have been adequate in many situations, they are not adequate to ensure that the scores assigned to the agent communications by contact center supervisors follow a standardized baseline. For instance, if one communication receives scores from different supervisors ranging from awful to excellent, then the entire monitoring system is defective. Additionally, if the average score assigned to all monitored communications within a time frame varies greatly, then the contact center manager loses the ability to evaluate the performance of the contact center agents, both collectively an individually, over time. However, if compliance with a baseline for scoring communications is enforced, then the accuracy of the assigned scores will be improved and the efficiency of the monitoring segment of a contact center will be drastically increased. Not only will a contact center manager realize increased accuracy, but the requirement to monitor a large number of communications to get an accurate indicator of an agent's performance will be eliminated. Therefore, there is a need for further improvement in the current ways in which agent communication scoring is handed.

SUMMARY

Various technologies and techniques are disclosed for automating the process of ensuring an adequate baseline for quality metrics in a contact center. A contact center agent receives an incoming communication. A group of supervisors is assigned to score the communication. The system receives the scores assigned to the communication and makes an evaluation of the group of supervisors' scoring. The system programmatically compares the evaluation to predetermined criteria and if the evaluation does not meet the criteria, the system indicates the need for a scoring standardization session.

In one embodiment, a plurality of scores are received, each of the scores being assigned by a supervisor to a communication between and agent and a third party. An evaluation of the scores is made and compared to predetermined criteria. If the evaluation does not meet the predetermined criteria, then the need for scoring standardization is indicated.

In a further embodiment, a plurality of scores are received, each of the scores being assigned by a supervisor to a single communication between and agent and a third party. An evaluation of the scores is made by calculating the range of the highest assigned score to that of the lowest assigned score. The range is then compared to predetermined criteria, and if the range does not meet the predetermined criteria, then the need for scoring standardization is indicated.

In an alternate embodiment, a plurality of scores are received, each of the scores being assigned by a supervisor to a communication between and agent and a third party. An evaluation of the scores is made by calculating the mean score and standard deviation, which is then compared to a predetermined expected mean and standard deviation. If the evaluation does not meet the predetermined criteria, then the need for scoring standardization is indicated.

Yet other forms, embodiments, objects, advantages, benefits, features, and aspects of the present invention will become apparent from the detailed description and drawings contained herein.

DETAILED DESCRIPTION

Figure 1:
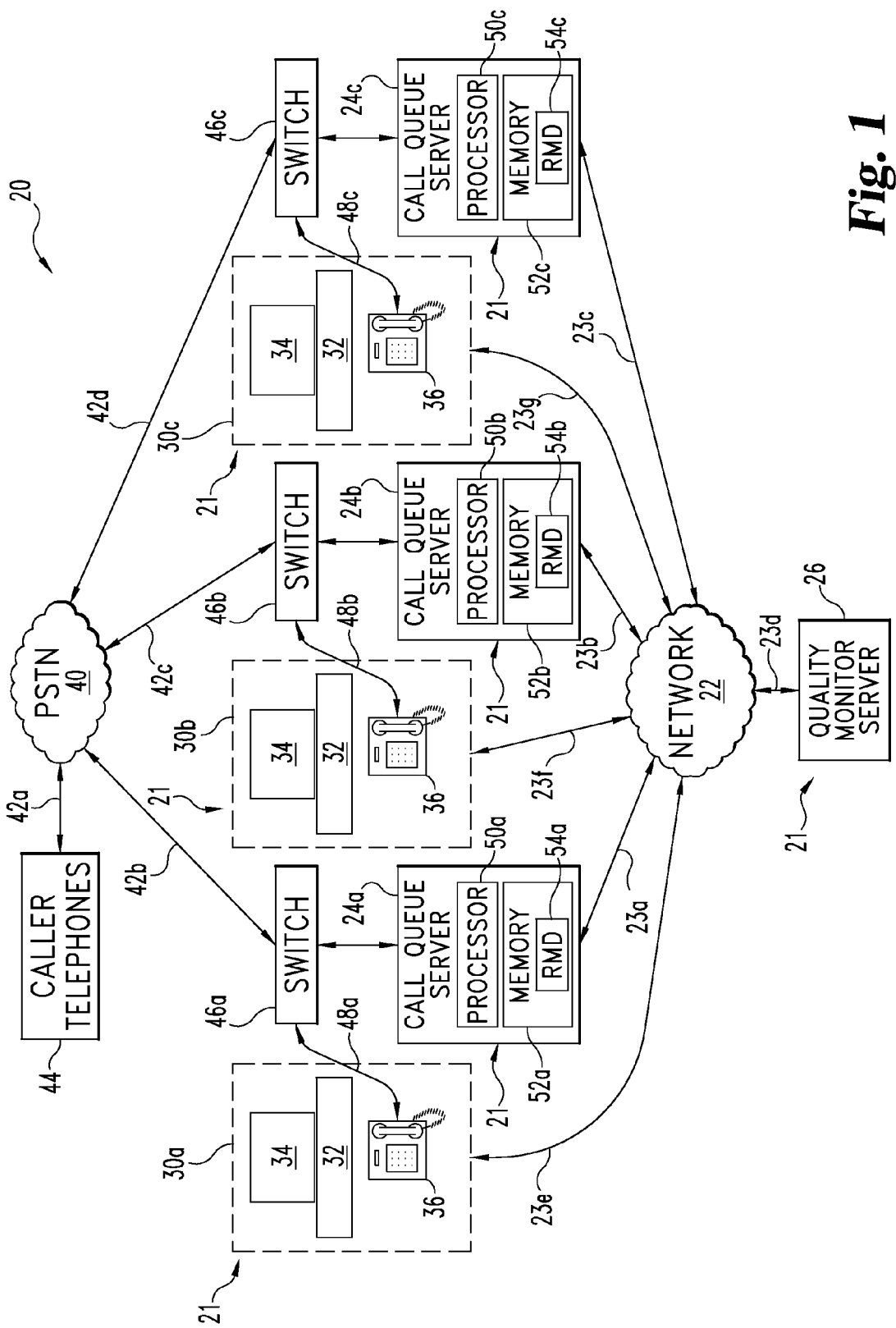
FIG. 1 is a diagrammatic view of a computer system of one implementation.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One implementation includes a unique system for locating resources for ensuring uniformity of scoring, such as in a contact center. FIG. 1 is a diagrammatic view of computer system 20 of one embodiment of the present invention. Computer system 20 includes computer network 22. Computer network 22 couples together a number of computers 21 over network pathways 23. More specifically, system 20 includes several servers, namely Call Queue Servers 24*a*, 24*b*, and 24*c*, and a Quality Monitor Server 26. System 20 also includes agent client workstations 30*a*, 30*b*, and 30*c*. While computers 21 are each illustrated as being a server or client, it should be understood that any of computers 21 may be arranged to include both a client and server. Furthermore, it should be understood that while seven computers 21 are illustrated, more or fewer may be utilized in alternative embodiments.

Call Queue Servers 24*a*, 24*b*, and 24*c* and Quality Monitor Server 26 include one or more processors or CPUs (50*a*, 50*b*, 50*c*, and 50*d*, respectively) and one or more types of memory (52*a*, 52*b*, 52*c*, and 52*d*, respectively). Each memory 52*a*, 52*b*, 52*c*, and 52*d* includes a removable memory device (54*a*, 54*b*, 54*c*, and 54*d*, respectively). Although not shown to preserve clarity, each computer 21 of system 20 includes one or more processors or CPUs and one or more types of memory. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or generic) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

System 20 further illustrates Public Switched Telephone Network (PSTN) 40 coupled to computer-controlled telephone switches 46*a*, 46*b*, and 46*c* (alternatively designated switches 46) of servers 24*a*, 24*b*, and 24*c* by pathways 42*b*, 42*c*, and 42*d*, respectively. Caller telephones 44 are coupled to PSTN 40 by pathway 42*a*. Switches 46 are also coupled to telephones 48*a*, 48*b*, and 48*c* (alternatively designated telephones 48). For the sake of clarity, each switch 46 is shown coupled to a corresponding telephone 48. However, is should be understood that each of telephones 48 may be coupled to one or more switches and that switches 48 may be located at one or more physical locations. Switches 46 may be arranged in the form of a Private Branch Exchange (PBX), predictive dialer, Automatic Call Distributor (ACD), a combination of these, or another switching configuration as would occur to those skilled in the art. Telephones 48 may be in the form of a handset, headset, or other arrangement as would occur to those skilled in the art. Telephones 48*a*, 48*b*, and 48*c* are each associated with a different one of agent workstations 30*a*, 30*b*, and 30*c*, respectively (collectively designated agent workstations 30). Agent workstations 30 each include an agent computer 32 coupled to a display 34. Agent computers 32 may be of the same type, or a heterogeneous combination of different computing devices. Likewise, displays 34 may be of the same type, or a heterogeneous combination of different visual devices. Although not shown to preserve clarity, each agent workstation 30 may also include one or more operator input devices such as a keyboard, mouse, track ball, light pen, and/or microtelecommunicator, to name just a few representative examples. Also, besides display 34, one or more other output devices may be included such as loudspeaker(s) and/or a printer.

Computer network 22 can be in the form of a Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22. It should also be recognized that computer network 22 may include one or more elements of PSTN 40. Indeed, in an alternate embodiment, PSTN 40 and computer network 22 are provided as a common network.

In one embodiment, system 20 operates as a contact center at one or more physical locations that are remote from one another with call queue servers 24*a*, 24*b*, and 24*c* being configured as contact center server hosts, Quality Monitor Server 26 being configured as a server for monitoring the scoring of agent communications, and agent workstations 30*a*, 30*b*, and 30*c* each arranged as a contact center client host. Additional telephones 48 may be connected to switches 46 that each correspond to an additional client host to provide more agent workstations 30 (not shown). Typically contact center applications of system 20 would include many more agent workstations of this type at one or more physical locations, but only a few have been illustrated in FIG. 1 to preserve clarity. Also, one or more servers 24 may be configured as a contact center server host at one or more physical locations. Furthermore, one or more servers 24 may also be configured to provide, collectively or individually, the features of Quality Monitor Server 26 described herein.

Alternatively or additionally, system 20 may be arranged to provide for distribution and routing of a number of different forms of communication, such as telephone calls, voice mails, faxes, e-mail, web chats, web call backs, and the like. Furthermore, business/customer data associated with various communications may be selectively accessed with system 20. This data may be presented to an agent at each agent workstation 30 by way of monitor 34 operatively coupled to the corresponding agent computer 32.

References herein to a "score" shall be understood to include, by way of non-limiting example, one or more numerical values, one or more letter grades, or a completed evaluation form. Many other methods of scoring are contemplated and their use within the current system and method is desired to be protected.

Figure 2:
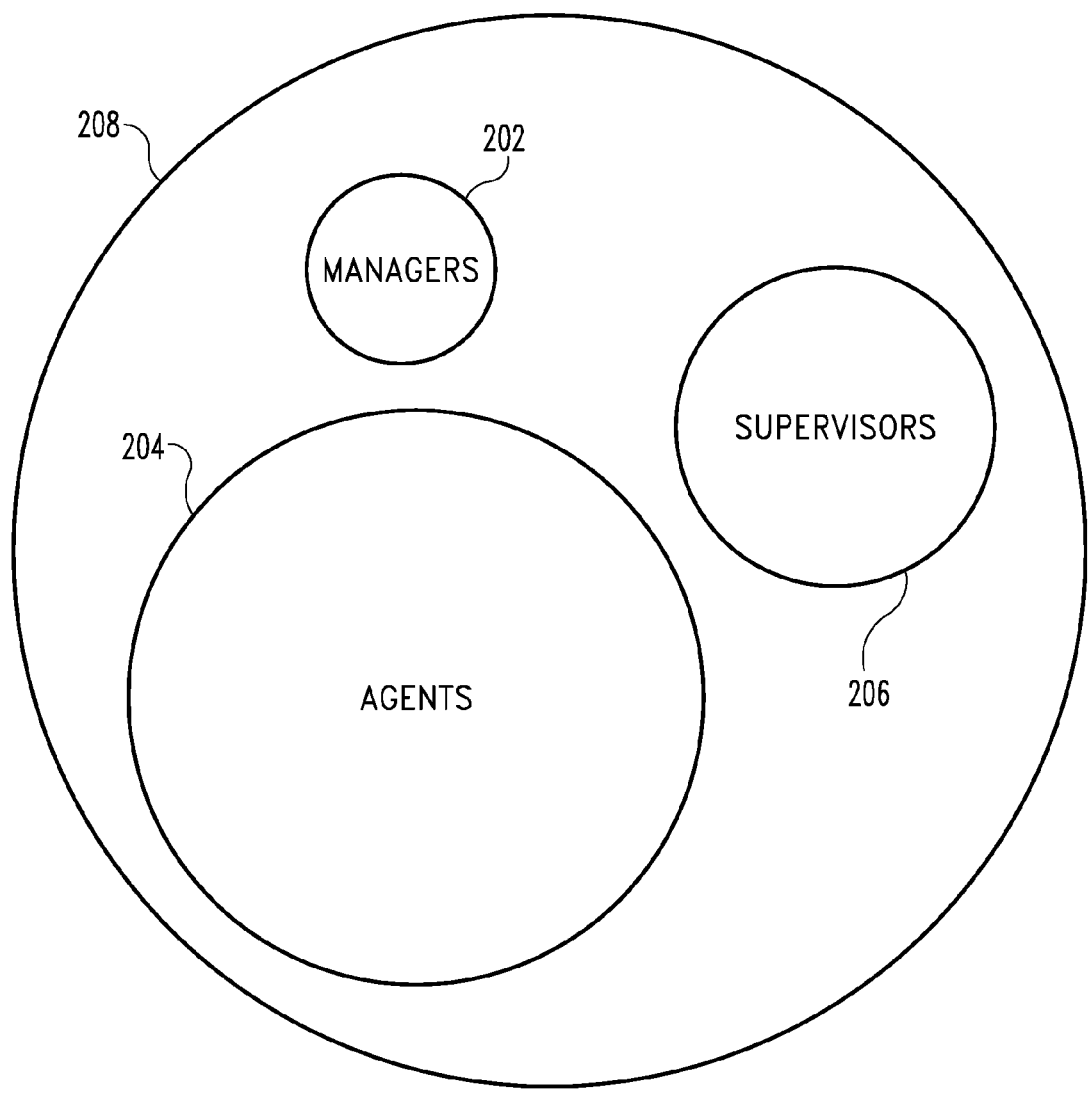
FIG. 2 is a Venn diagram depicting the relationship of agents, supervisors, and managers.

FIG. 2 shows the personnel 208 associated with a contact center in the illustrative embodiment. Personnel 208 may include one or more people designated as managers 202, agents 204, or supervisors 206, although the contact center may have other personnel 208. Preferably, a larger number of agents 204 exist within the contact center than supervisors 206, and a larger number of supervisors 206 than managers 208. Each supervisor 206 is responsible for monitoring a set of one or more assigned agents in the system 20. In the illustrative embodiment, an assigned set of agents is not exclusive to one supervisor and is assigned by the Quality Monitor Server 26. In addition, managers 202 are typically responsible for overseeing the supervisors 206.

Figure 3:
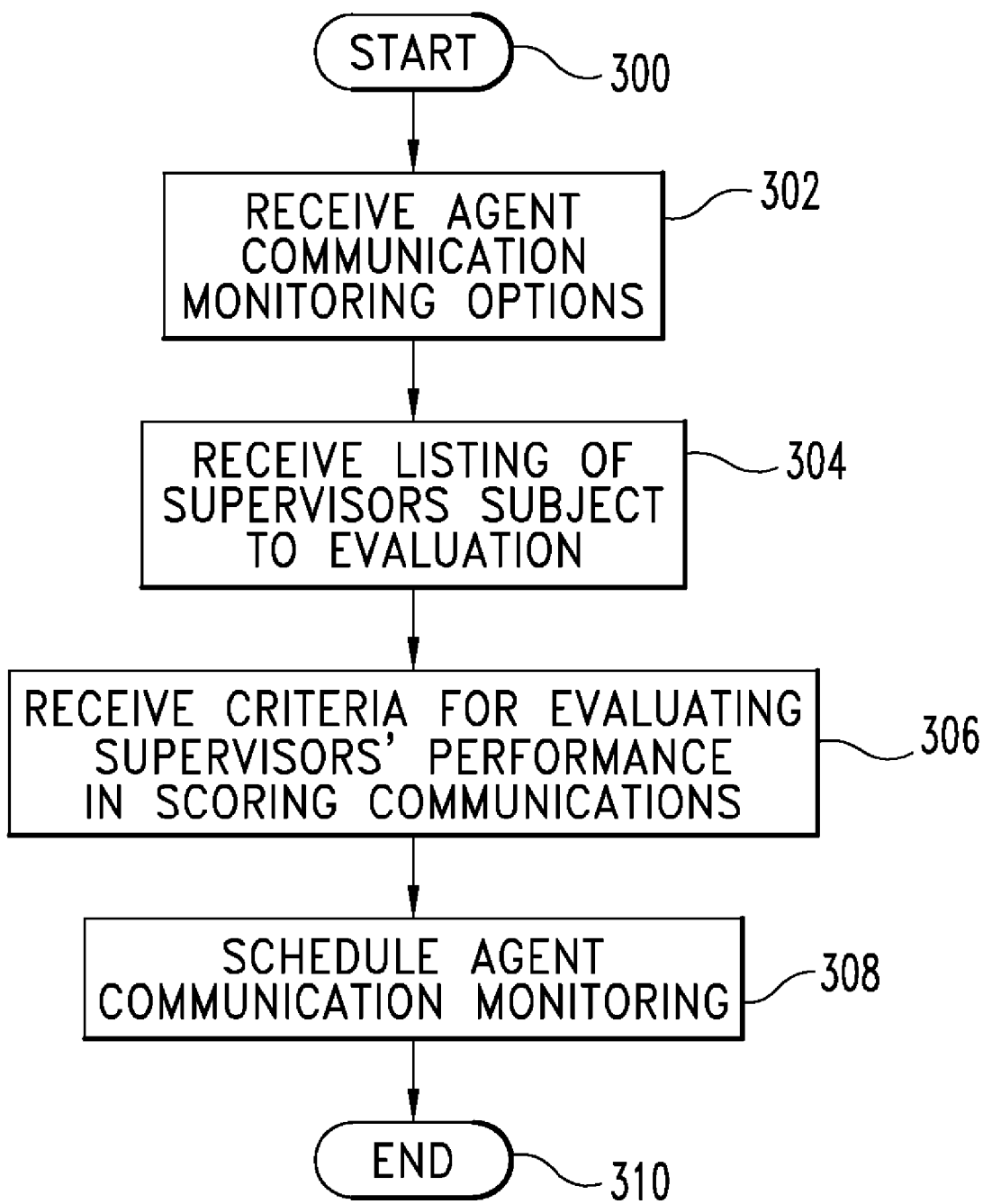
FIG. 3 is a process flow diagram demonstrating the stages involved in configuring the system of FIG. 1 for use.

Turning now to FIG. 3 with continued reference to FIGS. 1-2, the stages for implementing one or more aspects of system 20 are described in further detail. FIG. 3 is a high level process flow diagram that demonstrates the process for configuring system 20 to monitor agent communications, coordinate their scoring, and evaluate the performance of the supervisors 206. In one form, the process of FIG. 3 is at least partially implemented in the operating logic of system 20. The process begins at start point 300 with the system 20 receiving a set of configuration options specifying how agent communications should be monitored (stage 302). In the illustrative embodiment, a contact center manager 202 may select these and other options described herein through the use of a graphical user interface on Quality Monitor Sever 26. These configurations options may include, but are in no way limited to, the number of communications to monitor for each agent 204 during a timeframe, the type of communications to monitor, the length of each communication to monitor, and how to have each communication monitored. In one embodiment, the agent communications are telephone calls between the agent 204 and a third party which are recorded and stored for subsequent review. In another embodiment, the supervisors 206 are assigned a time during which to monitor the agent's communications in real time.

Once the agent monitoring options have been configured (stage 302), the system 20 may receive a listing of the supervisors 206 who are subject to performance evaluation (stage 304). In one embodiment, the listing of supervisors 206 includes all of the supervisors of a contact center collectively. In another embodiment, the listing includes only a subset of supervisors who are currently subject to review. In a further embodiment, the listing includes a collection of new or inexperienced supervisors and a comparatively smaller number of experienced supervisors.

After the supervisors 206 have been configured (stage 304), the system 20 may receive a set of criteria for evaluating the supervisors' performance is assigning scores to communications (stage 306). In one embodiment, the set of criteria includes a predetermined variation range in which the difference in the scores assigned to the same call by different supervisors may acceptably fall. In another embodiment, the set of criteria includes a range in which the assigned score of an inexperienced supervisor is allows to differ from the score assigned to the same communication by an experienced supervisor. In the alternative embodiment, the set of criteria may include a mean score and acceptable standard deviation range.

Once the system 20 is configured for use, the system 20 may proceed to schedule agent communication monitoring (stage 308). In one embodiment, this may include bi-monthly recordings of calls for each agent. In another embodiment, this may include the live monitoring of an agent during a randomly generated time of their shift once per week. It shall be understood that many other call monitor scheduling plans could be utilized without departing from the spirit of the present system and method. The process then ends at end point 310.

Figure 4:
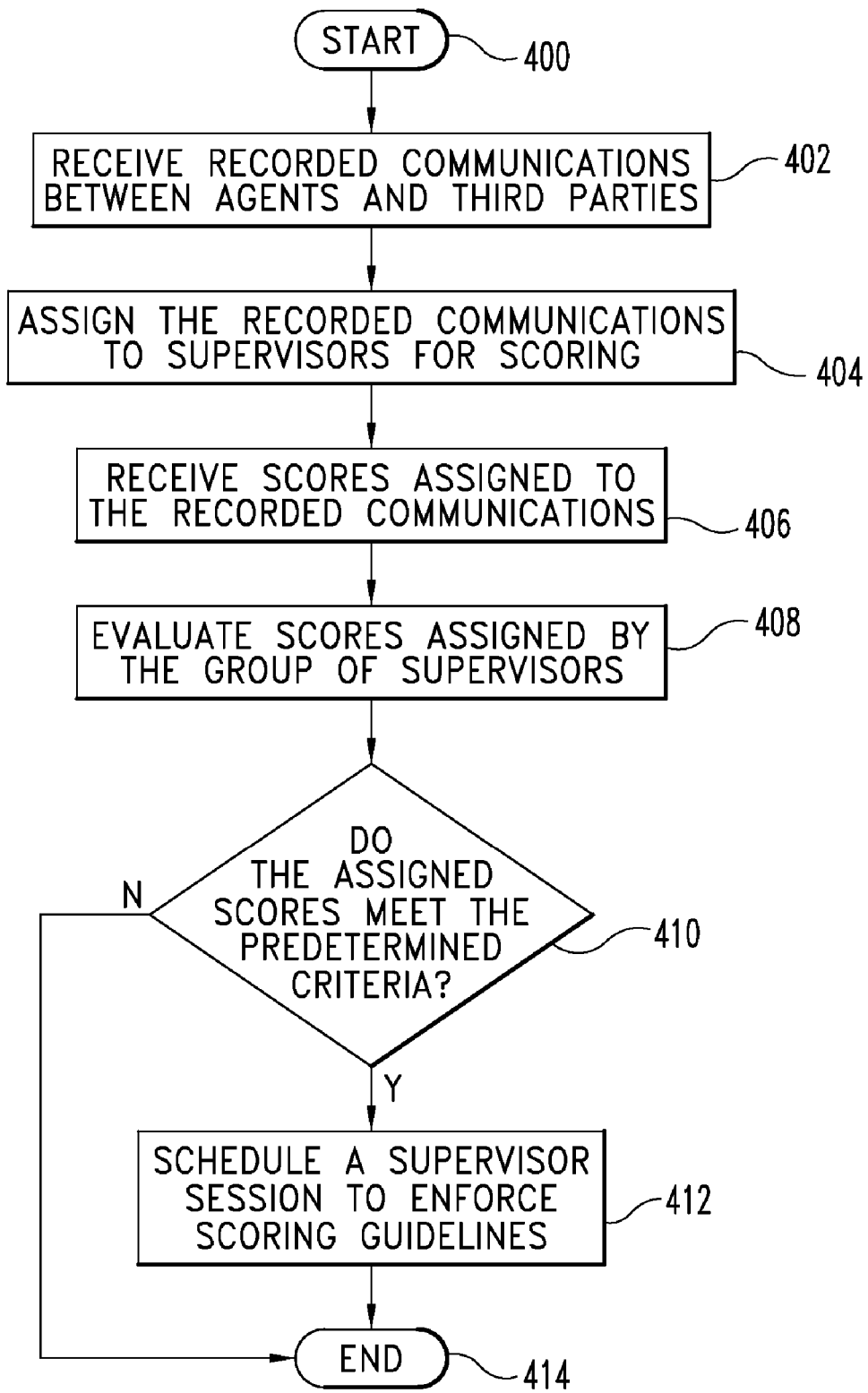
FIG. 4 is a process flow diagram for the system of FIG. 1 demonstrating the stages involved in making an evaluation of the scores assigned to monitored communications within a contact center.

FIG. 4 illustrates the stages involved in receiving and evaluating scores assigned by a group of supervisors and programmatically scheduling a scoring standardization session in response to an evaluation which does not fall within acceptable tolerances. In one form, the process of FIG. 4 is at least partially implemented in the operating logic of system 20. The process begins at start point 400 with the system 20 receiving a plurality of recorded communications (stage 402).

In the illustrative embodiment, each communication is between an agent in the group of agents 204 and a third party external to the contact center. In another embodiment, the communication may be between two agents in the group of agents 204, an agent and a supervisor in the group of supervisors 206, or any other combination within a contact center that may be known to one skilled in the art.

Once the recorded communications have been received (stage 402), the system 20 may then assign the communications to the group of supervisors 206 for scoring (stage 404). In the illustrative embodiment, at least one communication may be assigned to more than one supervisor in the group of supervisors 206 for scoring to allow subsequent comparative analysis. In the alternate embodiment, each communications may be assigned to only one supervisor in the group of supervisors 206 for scoring.

After the communications have been assigned to various supervisors 206 for scoring (stage 404), the system 20 receives the assigned scores (stage 406). In a further embodiment, the system 20 may remind the supervisors 206 that communications have been assigned to them for scoring after a certain period of time. This reminder may optionally be in the form of an e-mail, voice message, screen pop, or printed reminder just to name a few representative examples.

After the assigned scores have been received (stage 406), the system 20 makes an evaluation of the scores assigned by the group of supervisors (stage 408). In the illustrative embodiment, the scores associated with communications which were assigned to more than one supervisor in stage 404 are evaluated. In a further embodiment, the evaluation may include the computation of the variance between the scores assigned by a group of supervisors to the same communication. In another embodiment, the evaluation may include the comparing of the score assigned by one or more inexperienced supervisors to the score assigned by a more experienced supervisors. In an alternate embodiment, the evaluation may include the calculation of the mean and standard deviation of the scores assigned by the group of supervisors. In another alternate embodiment, the evaluation may include the calculation of the mean and standard deviation of the scores assigned by one or more individual supervisors or small groups of supervisors.

Once the evaluation of the assigned scores has been made (stage 408), the evaluation may then be compared to the criteria supplied in stage 306 to make a determination of the quality of the scores assigned by the group of supervisors (stage 410). In the illustrative embodiment, this assessment may include the comparison of the variance between scores assigned to the same communication to a predetermined tolerance. In the alternate embodiment, the calculated mean and standard deviation may be compared to a predetermined acceptable mean and standard deviation.

If the system 20 determines that the evaluation does not meet the predetermined criteria, then the system 20 indicates a need for scoring standardization. In the illustrative embodiment, the system 20 schedules a supervisor session to enforce or implement a set of scoring guidelines (stage 412) in response to this indication and the process ends at stage 414. In a further embodiment, the session may be a meeting between the supervisors 206 and the manager 202 to reinforce a current set of communication scoring guideline in an attempt to improve accuracy. This session may be a face-to-face meeting, web conference, teleconference, training session, training module, or any other method designed to improve supervisor performance. In an alternate embodiment, an individual training module may be communicated to a supervisor in response to the indication of a need for scoring standardization. If the evaluation does meet the predetermined criteria in stage 410, then the process ends at stage 414.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

What is claimed is:

1. A method comprising the steps of:
receiving a plurality of score sets, wherein each of said score sets includes two or more scores assigned by a supervisor within a plurality of supervisors to a communication between a contact center agent and a third party, and each score within a selected score set was assigned by a unique supervisor;
making an evaluation of said plurality of scores by comparing at least one score within each score set to at least another score within said score set;
comparing said evaluation to a predetermined criteria without manual intervention; and
if the evaluation does not meet the predetermined criteria, indicating a need for communication scoring training for at least one identified supervisor within said plurality of supervisors.

2. The method according to claim 1 further comprising the step of scheduling a training session for at least one of said plurality of supervisors in response to said indicating.

3. The method according to claim 2 wherein said training session is scheduled for all of said plurality of supervisors.

4. The method according to claim 1, wherein at least two scores in said plurality of scores are assigned to the same communication.

5. The method according to claim 4, wherein each score assigned to a communication is assigned by a different supervisor in said plurality of supervisors.

6. The method of claim 5, wherein said making includes calculating a value corresponding to the difference between a first score and a second score assigned to the same communication.

7. The method of claim 5, wherein said first score is the highest score and said second score is the lowest score assigned to the communication.

8. The method of claim 7, wherein said predetermined criteria is a range by which the first score assigned to each communication may acceptably differ from the second score assigned to said communication.

9. The method of claim 6, wherein said predetermined criteria is a range by which the first score assigned to each communication may acceptably differ from the second score assigned to said communication.

10. The method of claim 1 wherein each score in said plurality of scores is assigned to a unique communication.

11. The method of claim 1, wherein said making includes calculating a mean and standard deviation for a subset of said plurality of scores.

12. The method of claim 8 wherein said subset includes only scores assigned by a specific supervisor in said plurality of supervisors.

13. The method of claim 8, wherein said predetermined criteria is an acceptable mean and standard deviation.

14. The method of claim 1, wherein said communication is a voice call.

15. The method of claim 1, wherein said communication is a web chat.

16. The method of claim 1, wherein said communication is an e-mail.

17. A computer readable medium having computer executable instruction for performing the steps recited in claim 1.

18. A computer readable medium having computer executable instruction for performing the steps recited in claim 8.

19. A computer readable medium having computer executable instruction for performing the steps recited in claim 11.

20. A computer-implemented system within a contact center comprising:
a communications network that supports communication between the agents and third parties of said contact center;
a monitoring component adapted to receive a plurality of score sets from a plurality of supervisors, each score set assigned to a communication within a plurality of communications between said agents and said third parties;
a quality component adapted to:
make an evaluation of said plurality of score sets by comparing at least one score within each score set to at least another score within said score set;
compare said evaluation to a predetermined criteria without manual intervention; and
if the evaluation does not meet the predetermined criteria, indicate a need for communication scoring training for at least one identified supervisor within said plurality of supervisors.

21. The system of claim 20 wherein said quality component is further adapted to schedule a training session for said plurality of supervisors in response to said indicating.

22. The system of claim 20, wherein said monitoring component receives at least two scores for each communication in said plurality of communications.

23. The system of claim 22, wherein said evaluation includes a value corresponding to the difference between a first score and a second score assigned to the same communication.

24. The system of claim 23, wherein said predetermined criteria is a range by which the first score assigned to each communication may acceptably differ from the second score assigned to said communication.

25. The system of claim 20, wherein said evaluation includes a mean and standard deviation.

26. The system of claim 25, wherein said predetermined criteria is an acceptable range for the mean and standard deviation.

27. The system of claim 20, wherein said communication is a voice call.

28. The system of claim 20, wherein said communication is a web chat.

29. The system of claim 20, wherein said communication is an e-mail.

30. A computer-readable medium having computer-executable instructions for causing a computer to perform steps comprising:
receiving a plurality of incoming score sets, wherein each of said score sets includes two or more scores assigned by a supervisor within a plurality of supervisors to a communication between a contact center agent and a third party, and each score within a selected score set was assigned by a unique supervisor;
accessing said score sets programmatically by comparing at least one score within each score set to at least another score within said score set
comparing said evaluation to a predetermined criteria without manual intervention; and
if the evaluation does not meet the predetermined criteria, indicating a need for communication scoring training for at least one identified supervisor within said plurality of supervisors.

31. The computer readable medium of claim 30, wherein said medium has instructions for causing a computer to further perform the step of scheduling a training session for at least one of said plurality of supervisors in response to said indicating.

32. The computer readable medium of claim 30, wherein said training session is scheduled for all of said plurality of supervisors.

33. The computer readable medium of claim 30, wherein said evaluation includes a range corresponding to the different between a first score and a second score assigned to said communication.

34. The computer readable medium of claim 33, wherein said predetermined criteria includes an acceptable scoring variation range.

35. The computer readable medium of claim 30, wherein the incoming communication is a voice call.

36. The computer readable medium of claim 30, wherein the incoming communication is a web chat.

37. The computer readable medium of claim 30, wherein the incoming communication is an email.

38. The computer readable medium of claim 30 wherein said communication is a group of communications.

* * * * *

UNITED STATES PATENT AND TRADEMARK OFFICE
CERTIFICATE OF CORRECTION

| | | |
|---|---|---|
| PATENT NO. | : 7,856,095 B2 | Page 1 of 1 |
| APPLICATION NO. | : 11/381661 | |
| DATED | : December 21, 2010 | |
| INVENTOR(S) | : Donald E. Brown | |

It is certified that error appears in the above-identified patent and that said Letters Patent is hereby corrected as shown below:

Title Page, Item (75) Inventors, please change "Indianapolis, IN (US)" to --Zionsville, IN (US)--

Signed and Sealed this

Third Day of May, 2011

David J. Kappos
*Director of the United States Patent and Trademark Office*